UNITED STATES PATENT OFFICE.

AUGUST BLANK AND WLADIMIR RODIONOW, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

YELLOW TO BROWN DYE.

951,046.  Specification of Letters Patent.  Patented Mar. 1, 1910.

No Drawing.  Application filed October 14, 1909.  Serial No. 522,618.

*To all whom it may concern:*

Be it known that we, AUGUST BLANK and WLADIMIR RODIONOW, chemists, citizens of, respectively, Germany and Russia, residing at Leverkusen, near Cologne, Germany, have invented new and useful Improvements in New Dyes, of which the following is a specification.

We have found that new and valuable dyestuffs are obtained by treating with aromatic amins the known dyestuffs which can be obtained by treating para-nitro-toluene sulfonic acid with caustic soda lye. These dyestuffs are known in commerce as curcumine S, direct yellow, sun yellow etc. They are chemically azoxystilbene disulfonic acid or azoazoxydistilbene disulfonic acid. (Green, *Journal of Chemical Society* 89 p. 1610).

The new dyestuffs thus obtained are after being dried and pulverized brownish powders soluble in water with from a yellow to brown color and dyeing unmordanted cotton from yellow to orange to brown shades which are distinguished by their excellent fastness to light and their fastness to oxidizing agents.

Example: Direct yellow (azoazoxydistilbene disulfonic acid) obtained from 70 parts by weight of para-nitro-toluene sulfonic acid (sodium salt) is stirred up with water and 12 parts of para-phenetidin, 50 parts of 30 per cent. caustic soda lye and 1000 parts of water are added. The resulting mixture is then heated to boiling for 20 hours in a vessel provided with a reflux condenser and a stirrer. The solution is neutralized with mineral acid and the dyestuff is precipitated with salt. It is after being dried and pulverized a yellowish-brown powder which is soluble in water with a yellow color, and which is soluble in concentrated sulfuric acid with a bluish-red color being precipitated in the shape of brown flakes by the addition of water. It dyes unmordanted cotton yellow shades.

Instead of direct yellow other of the above mentioned dies or other amins may be used e. g. para-amino-phenol, 1-naphthylamin, 1-naphthylamin-4-sulfonic acid, 2-naphthylamin-4.8-disulfonic acid, 1.8-naphthylenediamin-4 sulfonic acid etc.

We claim:

1. The herein described new dyestuffs obtainable by condensation of aromatic amins with the dyes which are produced by treating paranitrotoluene sulfonic acid with caustic soda lye, which dyestuffs are after being dried and pulverized brownish powders soluble in water with a yellow to brown color and dyeing unmordanted cotton from yellow to orange to brown shades fast to light and to the action of oxidizing agents, substantially as described.

2. The herein described new dyestuff obtainable by condensing direct yellow with para-phenetidin, which dyestuff is after being dried and pulverized a yellowish-brown powder, which is soluble in water with a yellow color, soluble in concentrated sulfuric acid with a bluish-red color, being precipitated in the shape of brown flakes from such a solution by addition of water and dyeing unmordanted cotton yellow shades, substantially as described.

In testimony whereof we have hereunto set our hands in the presence of two subscribing witnesses.

AUGUST BLANK.  [L. S.]
WLADIMIR RODIONOW.  [L. S.]

Witnesses:
OTTO KÖNIG,
CHAS. J. WRIGHT.